April 19, 1949.  P. REID  2,467,779
LIQUID CONTAINER
Filed Nov. 19, 1945
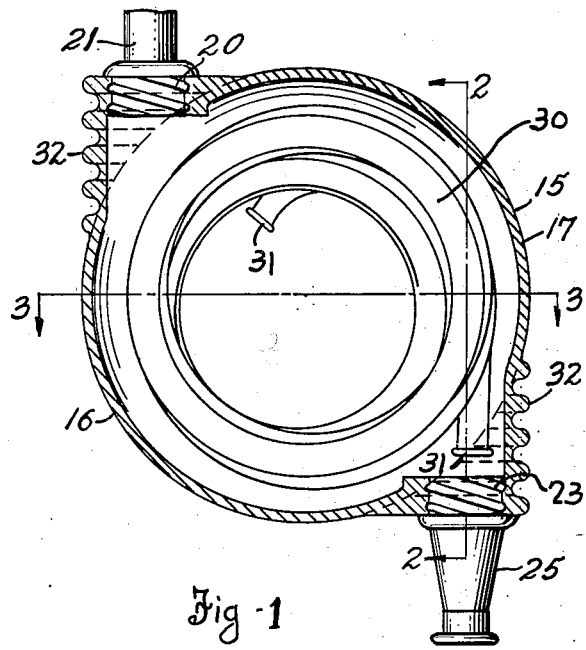
Fig. 1
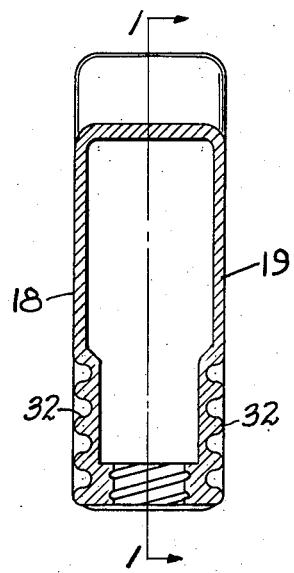
Fig. 2
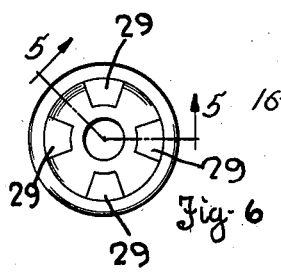
Fig. 6
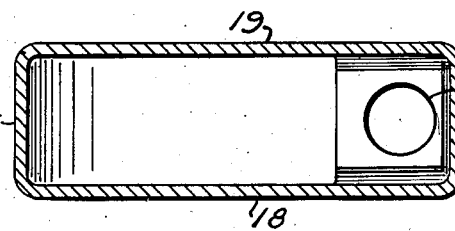
Fig. 3
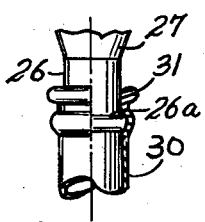
Fig. 10
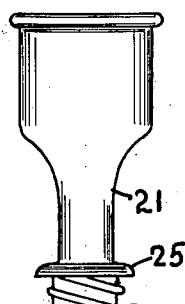
Fig. 4
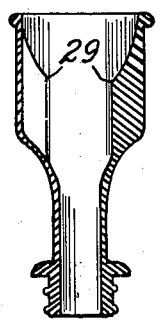
Fig. 5
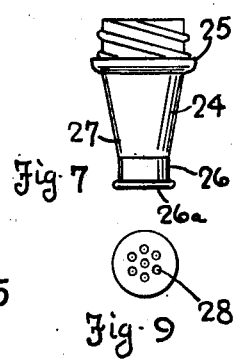
Fig. 7   Fig. 8
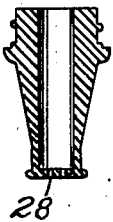
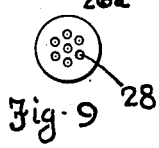
Fig. 9
PATRICIA REID
INVENTOR.
BY Joshua R H Pott
her attorney Patented Apr. 19, 1949

2,467,779

UNITED STATES PATENT OFFICE 2,467,779

LIQUID CONTAINER

Patricia Reid, Chicago, Ill.

Application November 19, 1945, Serial No. 629,525

3 Claims. (Cl. 206—1)

My invention relates to improvements in liquid containers such as syringes. For example, my invention relates to the provision of a container which is adapted to removably contain the hose, with which it is normally used.

My invention also relates to the provision of ribbed portions on the container, for giving re-enforcement, and also providing advantages in packaging for transportation, and in use.

My invention also involves the provision of one or more outlets, with threaded sockets, and a threaded connection to a source of liquid supply, and a threaded outlet to a hose.

My invention also relates to improvements in connections between an outlet and a hose.

Further objects and advantages will appear and be brought out more fully in the following specification, reference being had to the accompanying drawing, in which:

Fig. 1 is a central vertical section on the line 1—1 of Fig. 2.

Fig. 2 is a section on the line 2—2 of Fig. 1.

Fig. 3 is a transverse section on the line 3—3 of Fig. 1.

Fig. 4 is an elevation of the faucet connection.

Fig. 5 is a section on the line 5—5 of Fig. 6.

Fig. 6 is an end view of Fig. 4.

Fig. 7 is an elevation view of the outlet, or hose connection.

Fig. 8 is a section of Fig. 7.

Fig. 9 is a view of the end of Fig. 7 which is adapted to be inserted in the hose; and Fig. 10 shows the connection between the outlet and the hose, partly in section.

Referring more particularly to the drawings to illustrate the preferred form which I have selected to illustrate the principle of my invention, the drawings show a container 15, a front side 16, a rear side 17, and end walls 18 and 19.

The container may have a threaded socket 20, for a hollow connection 21 with a faucet.

The connection 21 also may have threads 22, to thread into the threaded socket 20.

The container also may be provided with another opening or socket 23, which is also threaded for a threaded outlet 24, adapted to be screwed into the opening 23.

The outlet 24 may have a stop flange 25, as will the connection 21.

The outlet may also be provided with a neck 26, and a tapered portion 27, from the neck to the stop flange 25.

The outlet may have a generally closed end, provided with openings 28.

The connection 21 may also be provided with an internal extension or extensions 29, for attachment to a faucet.

Adapted to be entirely contained within the container, when not in use, is a hose 30, which may be concealed within the container, as shown in Fig. 1.

The hose 30 may also have a bead 31 at each end, and, when the hose 30 is connected to the outlet 24, there may be a liquid-tight joint, as in Fig. 10, with the hose being expanded over the bead 26a, on the outlet 24.

I have also provided the container with tangentially extending ribbed portions 32, located diametrically opposed.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variation and modifications as come within the scope of the appended claims.

Having thus described my invention, what I claim as new and desire to secure by Letters Patent is:

1. In a device of the kind described, a casing of generally circular form having diametrically opposed generally tangential inlet and outlet openings, a hose of smaller diameter than said openings and receivable through one of said openings and coiled within said casing in a plurality of coils, a nozzle having a reduced end detachably secured to said outlet opening and a connecting member detachably secured to said inlet, said connecting member having a flared end adapted to receive a faucet end.

2. In a device of the kind described, a hollow casing of generally circular form having generally tangential extensions, with inlet and outlet openings therethrough, a hose of smaller diameter than said openings and receivable through one of said openings and coiled within said casing for storage therein, a nozzle having a reduced end adapted to be connected to one end of said hose, and detachably secured to said outlet, and a connecting member detachably secured to said inlet and having a flared end adapted to receive the end of a faucet.

3. In a device of the kind described, a casing of generally circular form having flat sides and diametrically opposed generally tangential flat portions providing an inlet and outlet therein, ribs on said flat portions, a hose of smaller diameter than said openings and receivable through one of said openings and coiled within said casing, a nozzle having a perforated diaphragm detachably secured to said outlet opening, for reception of said hose, and a connector member for reception of a faucet end detachably secured to said inlet.

PATRICIA REID.

REFERENCES CITED

The following references are of record in the file of this patent:

UNITED STATES PATENTS

| Number | Name | Date |
|---|---|---|
| 1,696,079 | Doolin | Dec. 18, 1928 |
| 2,117,747 | Smith et al. | May 17, 1938 |
| 2,170,281 | Snow | Aug. 22, 1939 |
| 2,198,933 | Damkrocker et al. | Apr. 30, 1940 |
| 2,210,676 | Krannak | Aug. 6, 1940 |
| 2,238,102 | Eisinger | Apr. 15, 1941 |
| 2,238,253 | Dick | Apr. 15, 1941 |
| 2,253,571 | Miller | Aug. 26, 1941 |
| 2,288,593 | Mudge | July 7, 1942 |
| 2,385,127 | Carlile | Sept. 18, 1945 |